United States Patent
Saegusa et al.

(10) Patent No.: US 9,838,466 B2
(45) Date of Patent: Dec. 5, 2017

(54) DISTRIBUTED CONTROL SYSTEM

(71) Applicant: Hitachi, Ltd., Chiyoda-ku, Tokyo (JP)

(72) Inventors: Takashi Saegusa, Tokyo (JP);
Toshihiro Arisaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 14/639,300

(22) Filed: Mar. 5, 2015

(65) Prior Publication Data

US 2015/0301512 A1 Oct. 22, 2015

(30) Foreign Application Priority Data

Apr. 16, 2014 (JP) ................. 2014-084168

(51) Int. Cl.
| | |
|---|---|
| *G05B 19/18* | (2006.01) |
| *H04L 29/08* | (2006.01) |
| *G05D 19/02* | (2006.01) |
| *G05B 19/042* | (2006.01) |

(52) U.S. Cl.
CPC .......... *H04L 67/10* (2013.01); *G05B 19/0421* (2013.01); *G05D 19/02* (2013.01); *G05B 2219/25232* (2013.01); *H04L 67/12* (2013.01)

(58) Field of Classification Search
CPC ......... H04L 67/10; H04L 67/12; G05D 19/02; G05B 19/0421; G05B 2219/25232
USPC ...................... 700/2–10, 276–287
See application file for complete search history.

(56) References Cited

U.S. PATENT DOCUMENTS

| | | | | |
|---|---|---|---|---|
| 2002/0110155 A1* | 8/2002 | Pearce | ............... | H04J 3/0682 370/519 |
| 2004/0153804 A1* | 8/2004 | Blevins | ............... | G05B 15/02 714/33 |
| 2004/0167672 A1* | 8/2004 | McIlhany | ............... | G05B 15/02 700/275 |
| 2007/0005266 A1* | 1/2007 | Blevins | ............... | G05B 17/02 702/22 |
| 2009/0319058 A1* | 12/2009 | Rovaglio | ............... | G05B 17/02 700/17 |
| 2010/0256825 A1* | 10/2010 | Nielsen | ............... | G06Q 10/06 700/283 |
| 2014/0261791 A1* | 9/2014 | Grabau | ............... | F16K 37/0075 137/551 |

FOREIGN PATENT DOCUMENTS

JP       2009-209646 A       9/2009

* cited by examiner

*Primary Examiner* — Ziaul Karim
(74) *Attorney, Agent, or Firm* — Crowell & Moring LLP

(57) ABSTRACT

A distributed control system and a control method for the distributed control system are provided that reduce adjustment and setup steps required when the system are applied to a control using sensors and actuators. The distributed control system includes a central communication unit and terminal communication units, the central communication unit and the terminal communication units connected to each other through a network. Communication control setup is automatically performed for each of the terminal communication units when control is exercised by using sensors and actuators connected to the terminal communication units based on each transmission characteristic of the time when a physical quantity generated by driving each of the actuators propagates to each of the sensors and on the setup of required performance of control.

7 Claims, 7 Drawing Sheets

DISTRIBUTED CONTROL SYSTEM

CLAIM OF PRIORITY

The present application claims priority from Japanese Patent Application JP 2014-084168 filed on Apr. 16, 2014, the content of which is hereby incorporated by reference into this application.

FIELD OF THE INVENTION

The present invention relates to a distributed control system which a plurality of sensors and actuators are connected to and controls the actuators based on information from the sensors.

BACKGROUND OF THE INVENTION

In recent years, a distributed control system is employed which connects through a network and collectively controls distributed sensors and actuators in a single system to reduce the wiring for an industrial apparatus or a factory automation (FA) system.

The distributed control system generally includes a central communication unit and a plurality of terminal communication units. The central communication unit provides integrated control of an overall sequence. The terminal communication units provide input/output control of the sensors and actuators.

In the distributed control system, a network is formed between the central communication unit and the terminal communication units.

The network is generally formed, for example, of a multi-drop topology or a daisy chain topology.

The central communication unit transfers control information to the terminal communication units through the network. The terminal communication units exercise input/output control of the sensors and actuators in accordance with the control information.

In addition, the terminal communication units transfer control information input from the sensors and actuators to the central communication unit through the network.

As described above, the distributed control system transmits and receives the control information between the central communication unit and the terminal communication units through the network so that the central communication unit can provide overall control of the distributed sensors and actuators.

Meanwhile, it is demanded in industrial fields that a control system using many sensors and actuators should have improved performance, for instance, by providing high speed and high accuracy.

The improvement of the performance of the above-mentioned control system may be obstructed by the response performance of a network for the distributed control system. If the network's response performance is low, the improvement of the performance of the above-mentioned control system is significantly obstructed. Therefore, it is desired that the response performance of the network should be as high as possible.

However, as common characteristics of the distributed control system, the response performance of the network deteriorates when the number of the sensors and actuators to be controlled increases.

Therefore, special communication control methods are explored for the network in the distributed control system so that the response performance is maintained as high as possible for the control of many sensors and actuators.

As a relevant related-art technology, for instance, JP 2006-209646 discloses a technology in which a synchronization signal is transmitted to all the external instruments when all the external instruments are confirmed ready for operation.

However, the technology described in JP 2006-209646 does not provide measures against an increase in the adjustment and setup steps of communication control. Therefore, it is difficult for the above-mentioned related-art technology to reduce the adjustment and setup steps required when the distributed control system is applied to a control system including many sensors and actuators.

The present invention has been made in view of the above circumstances to provide a distributed control system that is capable of automating adjustment and setup for communication control when the distributed control system is applied to a control system including many sensors and many actuators.

The present invention has also been made to provide a communication control system that automates the adjustment and setup for communication control to achieve required performance of the control system including many sensors and many actuators.

SUMMARY OF THE INVENTION

According to an aspect of the present invention, a distributed control system includes a central communication unit; a plurality of terminal communication units, each of which is connected to at least one sensor, at least one actuator, or both of at least one sensor and at least one actuator; a display and input unit connected to the central communication unit; and a network which connects the central communication unit and the terminal communication units with communication paths and has a plurality of communication channels between the central communication unit and the terminal communication units. The central communication unit includes a communication signal control section, a plurality of sets of communication ports, a central communication control section, and a communication control setup computation section. Each of the terminal communication units includes a communication signal control section, a plurality of sets of communication ports, a terminal communication control section, a communication channel setup section, a control information input/output setup section, a control computation section, and a device control section. The network includes a transmission path between at least one communication port of the terminal communication units and at least one communication port of the central communication unit or at least one communication port of another terminal communication unit. The central communication unit sets up communication control for the terminal communication units based on transmission characteristic which is increase/decrease characteristic of a physical quantity, the physical quantity is a quantity of a time when a physical quantity generated by driving the actuator connected to a terminal communication unit propagates to a sensor connected to the terminal communication unit or a sensor connected to another terminal communication unit.

Preferably, the central communication unit further includes a transmission characteristic acquisition section. Each of the terminal communication units further includes a transmission characteristic computation section. Each of the terminal communication units computes a transmission characteristic from a set of the actuator and the sensor with the transmission characteristic computation section and transfers the computed transmission characteristic to the central communication unit. The central communication unit stores the transmission characteristic transferred from the terminal communication units in the transmission characteristic acquisition section.

Preferably, the distributed control system is applied as a control apparatus for an active vibration damping instrument. A plurality of actuators and sensors which are connected to the terminal communication units are disposed at a plurality of locations of an object of which vibration is to be damped.

Preferably, one of the terminal communication units connected to the actuator drives the actuator. The terminal communication unit driving the actuator transfers periodically an output value to the actuator through the network to all the terminal communication units connected to the sensor. All the terminal communication units connected to the sensor compute the transmission characteristic simultaneously with driving of the actuator by using a physical quantity input from the sensor and the output value to the actuator, which is transferred through the network.

Preferably, a terminal communication unit performs an automatic control process in which a signal from at least one sensor connected to the terminal communication unit or other terminal communication units is used as an input and driving of at least one actuator connected to the terminal communication unit or other terminal communication units is used as an output. If another terminal communication unit intervenes between an input and output of the automatic control process, the terminal communication unit performs the automatic control process by using a communication of the network.

Preferably, when an amplitude of the transmission characteristic is not greater than a threshold value set for the central communication unit, the central communication unit prevents a set of the terminal communication units connected to the actuator and the sensor related to the transmission characteristic from communicating during the automatic control process by setting a communication control method for each of the terminal communication units through the network. The terminal communication units communicate during the automatic control process in accordance with the communication control method set for the central communication unit.

Preferably, the central communication unit selects a terminal communication unit to perform the automatic control process so as to minimize an amount of communication data required for the automatic control process of the terminal communication unit, and sets a method of the automatic control process for the selected terminal communication unit through the network. The terminal communication unit performs the automatic control process in accordance with the method of the automatic control process set by the central communication unit.

Preferably, the central communication unit compares an amount of communication data required for the automatic control process of a terminal communication unit, a communication delay time calculated from the communication channels, and an acceptable delay time that is a maximum delay time acceptable for control input/output which is calculated from required performance of the automatic control process. The central communication unit selects a terminal communication unit to perform the automatic control process, sets a method of the automatic control process for the selected terminal communication unit through the network, and sets a communication channel and communication cycle in execution of the automatic control process for each of the terminal communication units connected to the actuator and the sensor related to the automatic control process, so that the value of the communication delay time does not exceed the acceptable delay time. A terminal communication unit for which the method of the automatic control process is set by the central communication unit performs the automatic control process in accordance with a setting of the automatic control process for the terminal communication unit. A terminal communication unit for which the communication channel and the communication cycle are set by the central communication unit performs communication control in accordance with the communication channel and the communication cycle that are set for the terminal communication unit.

Preferably, the display and input unit has an input function to input setup information for the central communication unit, and transfer the setup information to the central communication unit. The display and input unit has an output function to acquire the setup information for the central communication unit, the transmission characteristic to be stored in the central communication unit, and the setup information for the terminal communication units from the central communication unit, and output the information acquired from the central communication unit. The input function and the output function are executable by using software-based GUI (graphical user interface).

According to the present invention, the distributed control system can automate adjustment and setup for communication control, which makes it possible to reduce manual steps for adjustment and setup when the distributed control system is applied to a control system including many sensors and many actuators and the number of sensors and/or actuators is changed.

According to the present invention, the distributed control system can ensure required performance of the control system including many sensors and many actuators, and makes it easy to perform adjustment and setup for the communication control.

DETAILED DESCRIPTION OF THE PREFERRED EMBODIMENTS

Figure 1A:
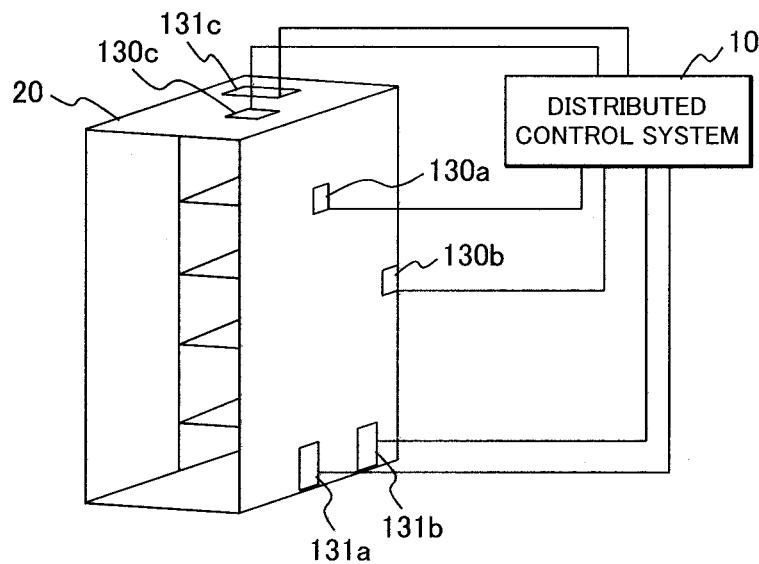
FIGS. 1A and 1B are diagrams illustrating an example in which a distributed control system according to an embodiment of the present invention is used as a vibration damping instrument.

An embodiment of the present invention will now be described with reference to the drawings. The embodiment will now be described on the assumption that a distributed control system is applied to an active vibration damping instrument. If plural identical elements are to be distinguished from each other for explanation purposes, a reference numeral is suffixed with an alphabetical character (a, b, c, . . . ). If the identical elements need not particularly be distinguished from each other for explanation purposes, the reference numeral is not suffixed with an alphabetical character.

First Embodiment

Figure 1B:
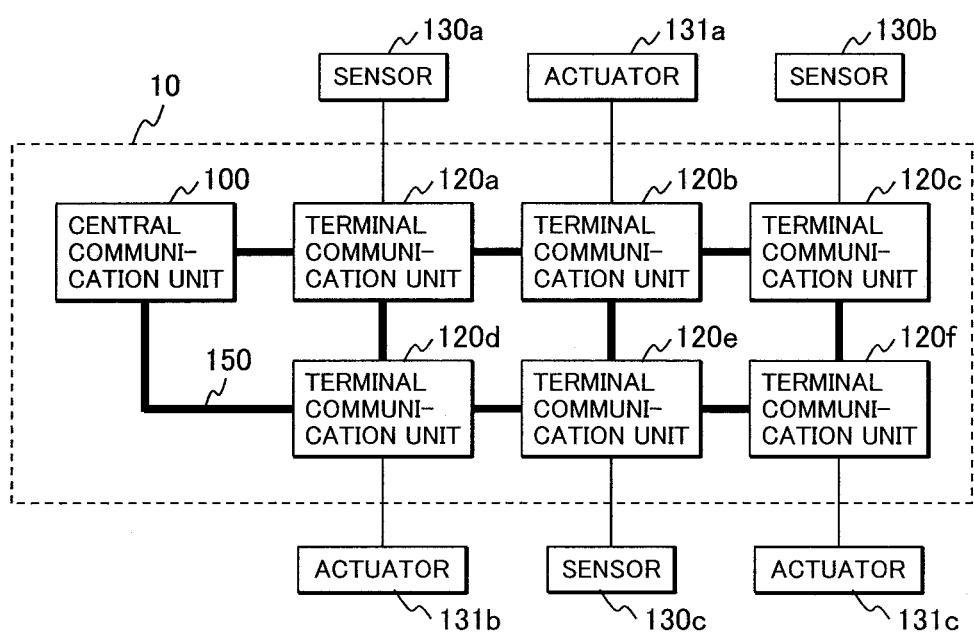

FIGS. 1A and 1B are diagrams illustrating an example in which a distributed control system 10 according to the embodiment of the present invention is used as a vibration damping instrument.

As shown in FIG. 1A, the distributed control system 10 according to the present embodiment is applied as a vibration damping instrument that actively damps the vibration of an object 20 of which vibration is to be damped. The distributed control system 10 is connected to and controls sensors 130a-130c and actuators 131a-131c, which are mounted on the object 20.

As shown in FIG. 1B, the distributed control system 10 includes a central communication unit 100, plural terminal communication units 120a-120f, and a network 150. The sensors 130a-130c and the actuators 131a-131c are respectively connected to the terminal communication units 120a, 120c, 120e, 120b, 120d, and 120f.

The network 150 is configured to include a communication path among the central communication unit 100 and the terminal communication units 120a, 120d and among the terminal communication units 120a-120f.

Figure 2:
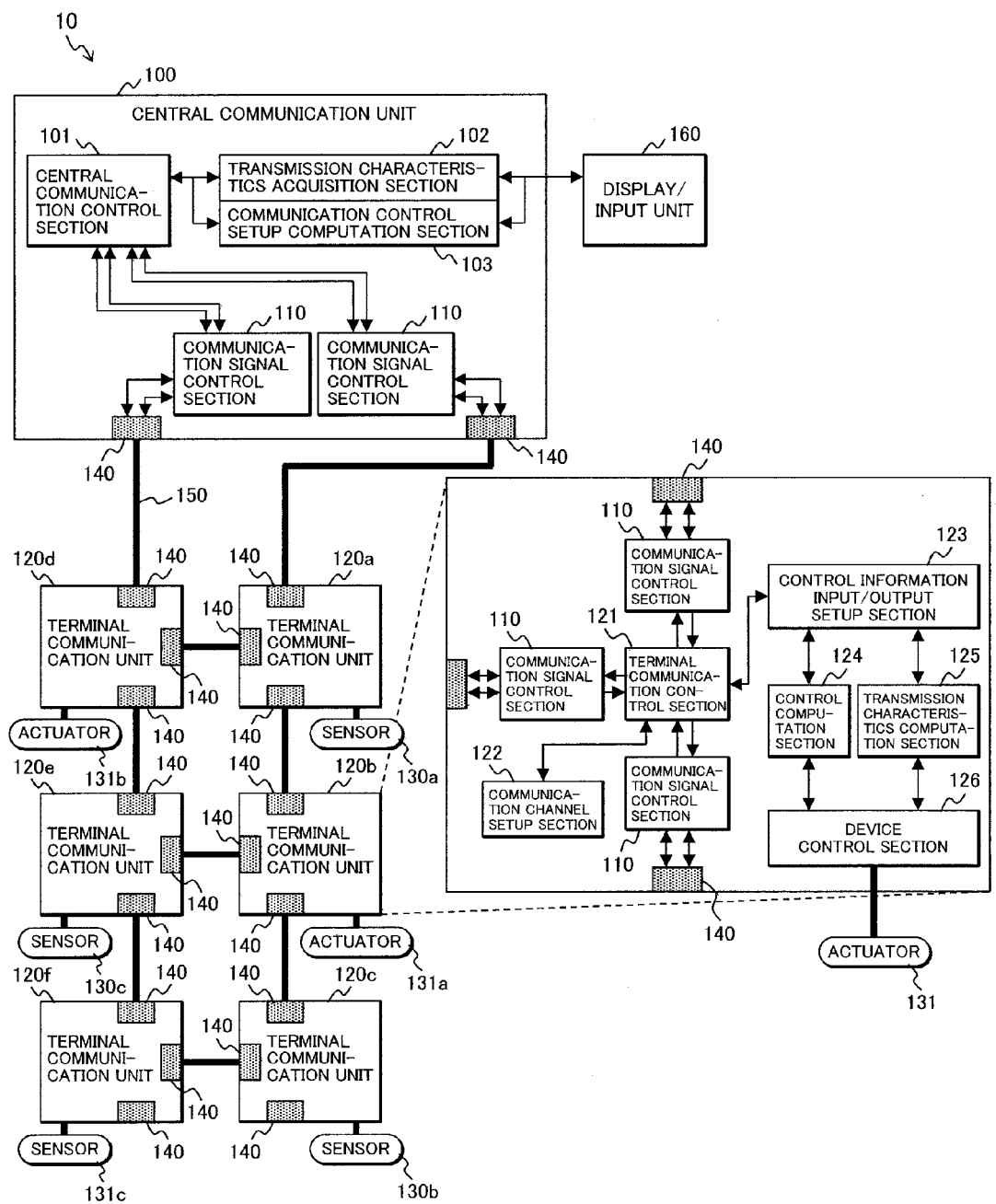
FIG. 2 is a diagram illustrating a configuration of the distributed control system according to the embodiment of the present invention.

FIG. 2 is a diagram illustrating a configuration of the distributed control system 10 according to the present embodiment.

The central communication unit 100 includes a communication signal control section 110, plural sets of communication ports 140, a central communication control section 101, a transmission characteristics acquisition section 102, and a communication control setup computation section 103.

Each of the terminal communication units 120 includes a communication signal control section 110, plural sets of communication ports 140, a terminal communication control section 121, a communication channel setup section 122, a control information input/output setup section 123, a control computation section 124, a transmission characteristics computation section 125, and a device control section 126.

The network 150 is configured to include a transmission path between at least one communication port 140 of each terminal communication unit 120 and a communication port 140 of the central communication unit 100 or a communication port 140 of another terminal communication unit 120.

The communication signal control section 110 provides bidirectional communication between the central communication unit 100 and a terminal communication unit 120 or between a terminal communication unit 120 and another terminal communication unit 120 without regard to the direction of communication.

Plural sensors 130 and actuators 131 may be connected to a terminal communication unit 120.

Operations of the elements of the distributed control system 10 will be described below with reference to the drawings.

Processing steps performed by the distributed control system 10 will now be described with reference to FIGS. 3, 4, 5, and 6.

Figure 3:
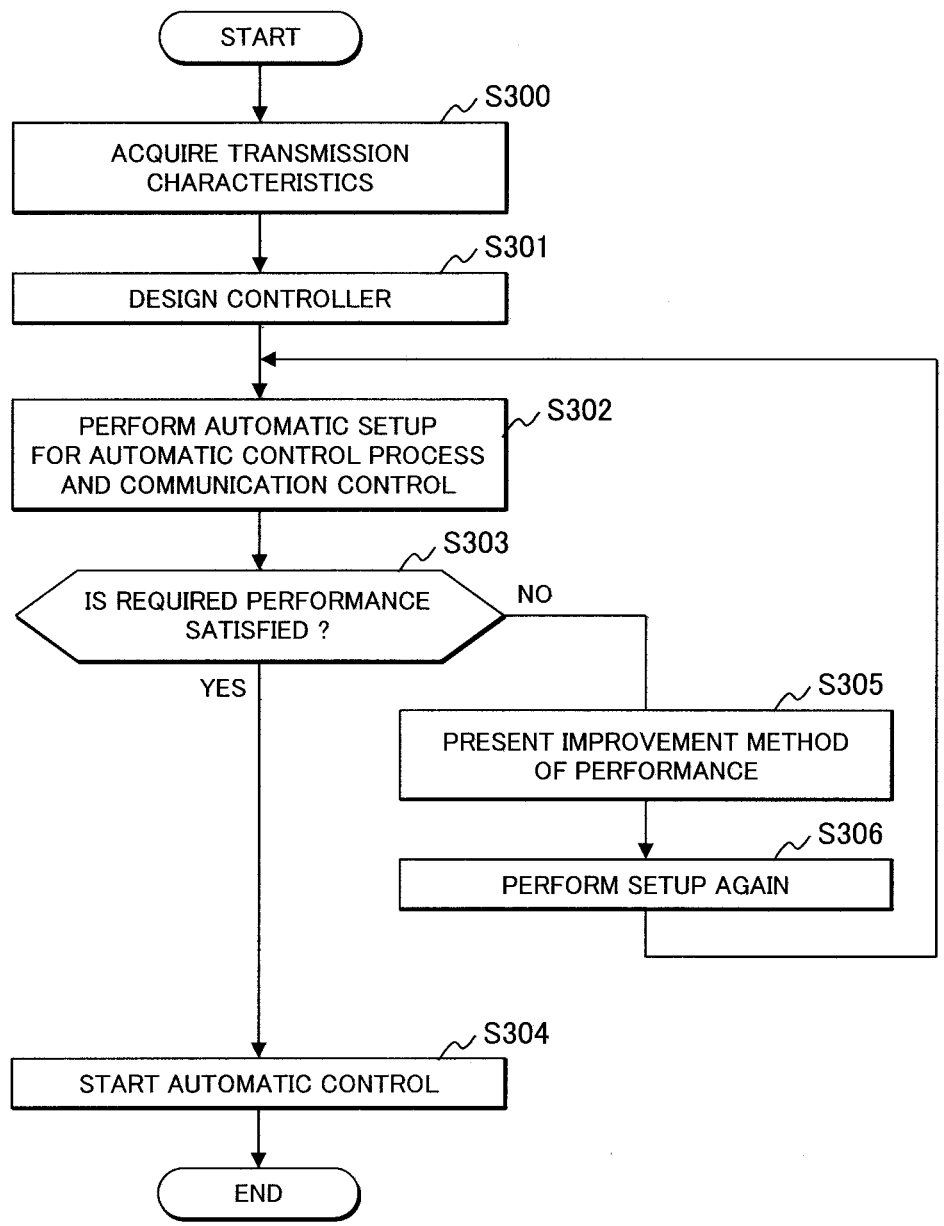
FIG. 3 is a flowchart illustrating processing steps performed by the distributed control system according to the embodiment of the present invention.

FIG. 3 is a flowchart illustrating the processing steps performed by the distributed control system 10 according to the present embodiment.

First of all, the distributed control system 10 acquires transmission characteristics (S300) by operations of the central communication unit 100 and the terminal communication units 120a-120f, the transmission characteristics being propagation characteristics of vibration of the object 20 from the actuators 131a-131c to the sensors 130a-130c connected to the terminal communication units 120a-120f.

A process performed in S301 will now be described with reference to the flowchart of FIG. 4.

Figure 4:
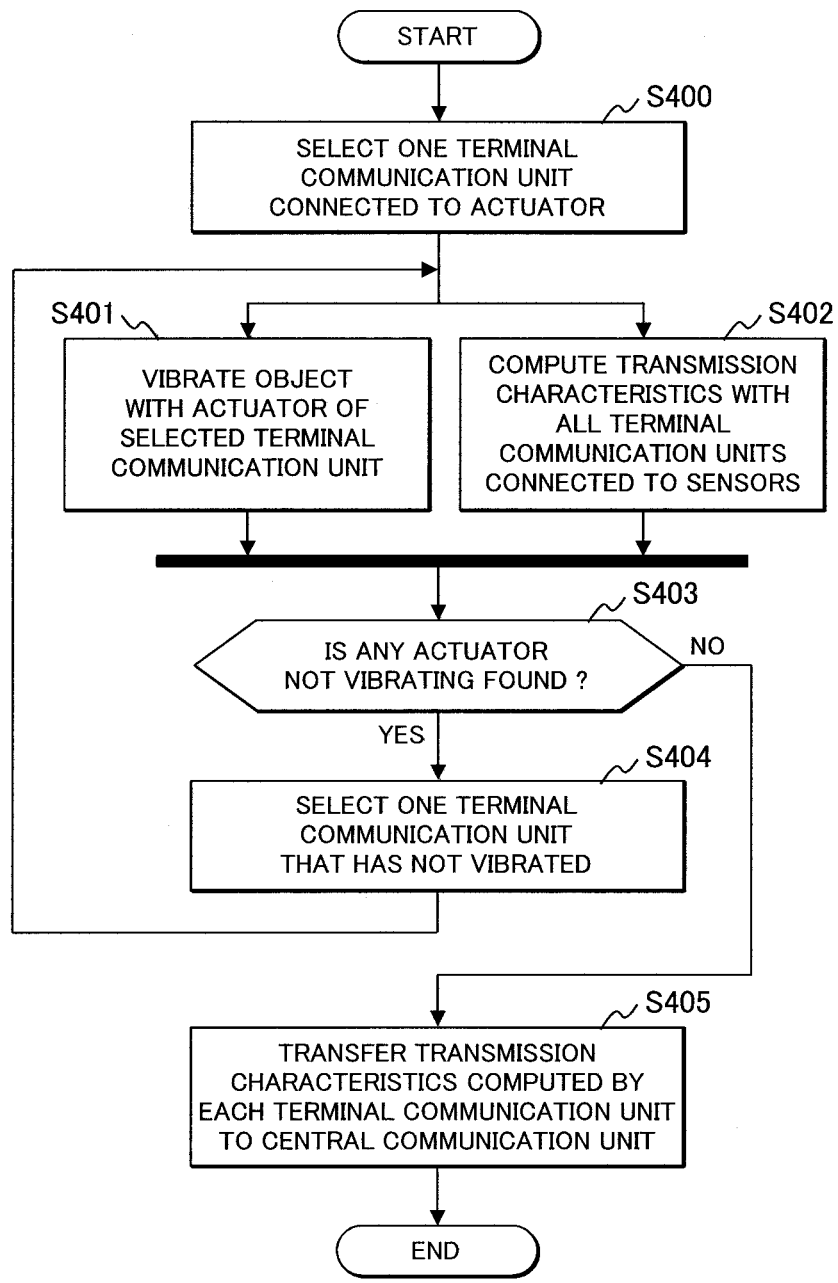
FIG. 4 is a flowchart illustrating processing steps of acquiring transmission characteristics of the distributed control system according to the embodiment of the present invention.

FIG. 4 is a flowchart illustrating processing steps of acquiring transmission characteristics of the distributed control system 10 according to the present embodiment.

First of all, the central communication unit 100, by a process of the transmission characteristics acquisition section 102, selects one of the terminal communication units 120b, 120d, 120f connected to the actuators 131a-131c (S400). Here, it is assumed that the terminal communication unit 120b is selected.

Next, the transmission characteristics acquisition section 102 of the central communication unit 100 transfers information about a method of vibrating the object 20 with an actuator 131 to the central communication control section 101. This information is addressed to the selected terminal communication unit 120b.

The central communication control section 101 transmits the transferred information about the vibration method to the terminal communication unit 120b through the communication signal control section 110 and the network 150.

The terminal communication unit 120b, using the terminal communication control section 121, receives the information about the vibration method, which is transmitted from the central communication unit 100. The terminal communication control section 121 transfers the received information about the vibration method to the control information input/output setup section 123.

The control information input/output setup section 123 transfers the transferred information about the vibration method to the transmission characteristics computation section 125. At the same time, the control information input/output setup section 123 changes its setup so that the terminal communication control section 121 and the transmission characteristics computation section 125 can transfer data.

Further, the control information input/output setup section 123 changes its setup so that an output value of the actuator 131a, which is transferred from the transmission characteristics computation section 125, is transferred to all the terminal communication units 120a, 120c, 120e connected to the sensors 130a-130c, respectively.

The transmission characteristics computation section 125 drives the actuator 131a through the device control section 126 based on the transferred vibration method. At the same time, the transmission characteristics computation section 125 periodically transfers an output value for the actuator 131a to the control information input/output setup section 123 (S401).

As the vibration method, a random vibration method, a sweep vibration method, or other common vibration method may be used.

It is preferred that, according to the sampling theorem, a frequency at which the output value for the actuator 131a is transferred to the control information input/output setup section 123 is at least two to four times the maximum frequency of the transmission characteristics to be acquired.

Simultaneously with the process in S401, all the terminal communication units 120a, 120c, 120e connected to the sensors 130a-130c perform a process at the same time.

First of all, the terminal communication units 120a, 120c, 120e receives the output value of the actuator 131a transmitted from the terminal communication unit 120b with the terminal communication control section 121. The terminal communication control section 121 transfers the received output value of the actuator 131a to the control information input/output setup section 123. The control information input/output setup section 123 transfers the transferred output value of the actuator 131a to the transmission characteristics computation section 125, and at the same time, changes its setup so that the terminal communication control section 121 and the transmission characteristics computation section 125 can transfer data. The transmission characteristics computation section 125 computes the transmission characteristics from the transferred output value of the actuator 131a and the input value of the sensors 130 that is acquired through the device control section 126 (S402).

After completion of all of the vibrating operation of the terminal communication unit 120a and the transmission characteristics computation process of the terminal communication units 120b, 120d, 120f in S401 and S402, if any actuator 131 not vibrating is found (if S403 is "YES") in the terminal communication units 120b, 120d, 120f connected to the actuators 131a-131c, the transmission characteristics acquisition section 102 in the central communication unit 100 selects one terminal communication unit 120 that has not performed the vibrating operation from among the terminal communication unit 120b, 120d, 120f connected to the actuators 131a-131c (for example, the terminal communication unit 120d is selected) (S404). Then, S401 and S402 are repeated.

In S403, if all the actuators 131 are found to be vibrated (if S403 is "NO") among the terminal communication unit 120b, 120d, 120f connected to the actuators 131a-131c, all the transmission characteristics from the actuators 131a-131c, which are computed individually by the terminal communication units 120b, 120d, 120f, are transmitted from the transmission characteristics computation section 125 to the central communication unit 100 through the control information input/output setup section 123 (S405). The transmission characteristics acquisition section 102 in the central communication unit 100 then receives all the transmission characteristics transmitted from the terminal communication units 120b, 120d, 120f through the central communication control section 101 and stores the received transmission characteristics in the transmission characteristics acquisition section 102.

Returning to the flowchart of FIG. 3, the processing steps performed by the distributed control system 10 will be described below beginning with S301.

A display and input unit 160 of the distributed control system 10 displays the transmission characteristics stored in the transmission characteristics acquisition section 102 of the central communication unit 100. Based on the transmission characteristics displayed on the display and input unit 160, a user of the distributed control system 10 feeds the inputs from the sensors 130a-130c back to the outputs of the actuators 131a-131c, and designs a controller for an automatic control process to suppress vibration (S301).

The designed controller is stored in the communication control setup computation section 103 of the central communication unit 100 through the display and input unit 160.

Next, the central communication unit 100 performs automatic setup for an automatic control process on the terminal communication units 120a-120f and for communication control (S302).

A process performed in S302 will be described with reference to the flowchart in FIG. 5 and an exemplary setup shown in FIG. 6.

Figure 5:
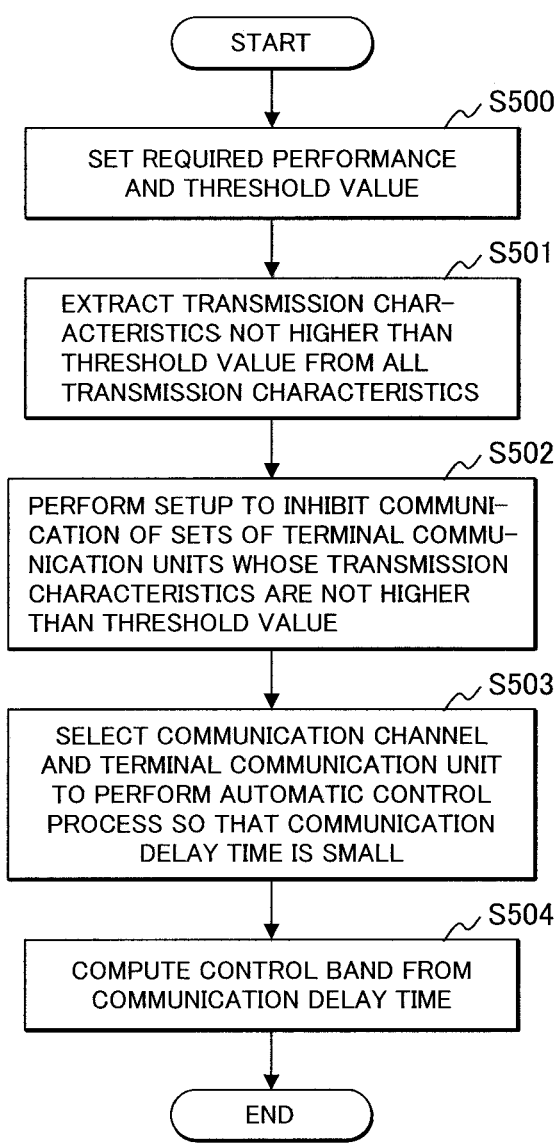
FIG. 5 is a flowchart illustrating a setup sequence for an automatic control process and communication control of the distributed control system according to the embodiment of the present invention.

FIG. 5 is a flowchart illustrating a setup sequence for an automatic control process and communication control that is performed by the distributed control system 10 according to the present embodiment.

Based on the transmission characteristics displayed on the display and input unit 160, a user of the distributed control system 10 sets an amplitude threshold value of the transmission characteristics used for automatic setup and a required performance as a control band for the automatic control process in the communication control setup computation section 103 through the display and input unit 160 (S500).

Next, the communication control setup computation section 103 of the central communication unit 100 extracts transmission characteristics not higher than the amplitude threshold value of the transmission characteristics from all the transmission characteristics stored in the communication control setup computation section 103 (S501).

Communication control setup information for inhibiting intercommunication during the execution of the automatic control process is transmitted through the central communication control section 101 to all the sets of the terminal communication units 120 that are connected to sensors 130 and actuators 131 related to the input/output of the transmission characteristics extracted in S501. The terminal communication units 120 transfer the communication control setup information, which is transmitted from the central communication unit 100, to the control information input/output setup section 123 through the terminal communication control section 121. The control information input/output setup section 123 performs setup for itself to inhibit communication to designated terminal communication units 120 during the execution of the automatic control process in accordance with the transferred communication control setup information (S502).

Next, the communication control setup computation section 103 of the central communication unit 100 selects a communication channel and a terminal communication unit 120 to perform the automatic control process so that the communication delay time is as small as possible with respect to the terminal communication units 120 permitted to establish communication during the process in S502 (S503).

The process performed in S503 will now be described in detail with reference to FIG. 6.

Figure 6:
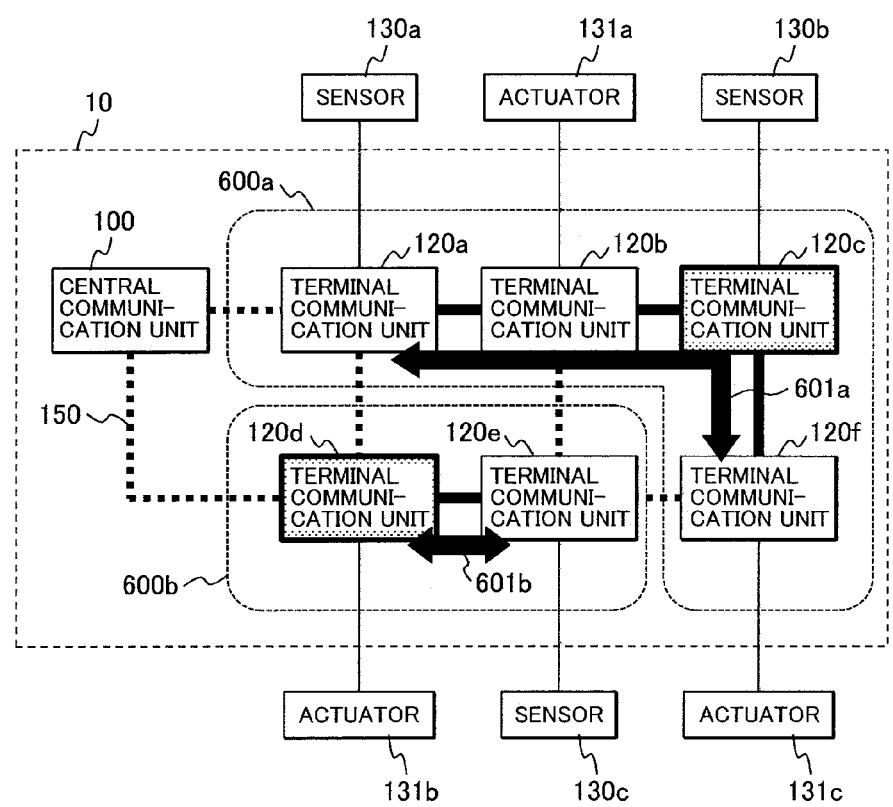
FIG. 6 is a diagram illustrating an exemplary setup for the automatic control process and communication control of the distributed control system according to the embodiment of the present invention.

FIG. 6 is a diagram illustrating an exemplary setup for the automatic control process and communication control of the distributed control system 10 according to the present embodiment.

First of all, a group of two or more terminal communication units 120 that are capable of communicating with each other is regarded as a communication group. All the terminal communication units 120 are arranged in plural communication groups 600.

In the example of FIG. 6, the terminal communication units 120a, 120b, 120c, 120f are arranged in a communication group 600a, and the terminal communication units 120d, 120e are arranged in a communication group 600b.

Next, a terminal communication unit 120 that performs the automatic control process is selected so that the amount of communication data transmitted to the network 150 is minimized to reduce an increase in the communication delay time in the communication of the network 150.

More specifically, the total amount of data is calculated required for the input/output of all the sensors 130 and actuators 131 connected to each of all the terminal communication units 120 included in each communication group 600. A terminal communication unit 120 handling the largest amount of data in each communication group 600 is then selected as the terminal communication unit 120 that performs the automatic control process.

In the example of FIG. 6, the terminal communication unit 120c is selected as a terminal communication unit 120 to perform the automatic control process in the communication group 600a, and the terminal communication unit 120d is selected as a terminal communication unit 120 to perform the automatic control process in the communication group 600b.

Next, a communication channel for each terminal communication unit 120 is set so that the communication delay time is as small as possible which would increase when the communication goes through the terminal communication units 120 as a repeater in the network 150.

More specifically, for each communication group 600 of terminal communication units 120, a communication channel that minimizes the number of the terminal communication units 120 as a repeater in the communication channel is selected from all the communication channels between the terminal communication unit 120 performing the automatic control process and another terminal communication unit 120. This selection process is performed for all the terminal communication units 120 included in all the communication groups 600.

In the example of FIG. 6, a communication channel indicated by a communication 601a is selected for the communication group 600a, and a communication channel indicated by a communication 601b is selected for the communication group 600b.

When the above process is performed, the communication control setup computation section 103 transmits a computation result about the automatic control process through the central communication control section 101 to a terminal communication unit 120 to perform the automatic control process which is selected from each communication group 600. The terminal communication unit 120 to perform the automatic control process, using the control information input/output setup section 123, receives the computation result about the automatic control process, which is transmitted from the central communication unit 100, through the terminal communication control section 121. The control information input/output setup section 123 performs setup for the execution of the automatic control process by storing the received computation result in the control computation section 124.

Further, in a similar way, the communication control setup computation section 103 transmits setup information about a communication channel selected for each terminal communication unit 120 to the corresponding terminal communication unit 120 through the central communication control section 101. Each terminal communication unit 120, using the communication channel setup section 122, receives the setup information about a communication channel, which is transmitted from the central communication unit 100, through the terminal communication control section 121, and sets the communication channel by storing the received setup information in the communication channel setup section 122.

Returning to the flowchart of FIG. 5, a process from step S504 will be described.

The communication control setup computation section 103 calculates the communication delay time of each terminal communication unit 120 from the communication channel set for each terminal communication unit 120 and the amount of communication data of each terminal communication unit 120. Further, the communication control setup computation section 103 calculates, for each communication group 600, the maximum delay time, which is the maximum communication delay time in a communication group 600 of the terminal communication units 120.

The communication control setup computation section 103 calculates, for each communication group 600 of the terminal communication units 120, the control band, which is the reciprocal of time that is approximately 8 to 10 times the maximum delay time (S504).

The value "approximately 8 to 10 times the maximum delay time" is a well-known multiplying factor used for calculating the control band. However, the value of the multiplying factor is not limited to the above-mentioned value. If, for example, an appropriate multiplying factor is experimentally predetermined, the predetermined factor may be used to calculate the control band.

Returning to the flowchart of FIG. 3, a process from step S303 by the distributed control system 10 will be described.

After the process of S302, if all the control bands calculated by the communication control setup computation section 103 satisfies the required performance of the control band set for itself (if S303 is "YES"), the central communication unit 100 transmits a start command of the automatic control process to all the terminal communication units 120a-120f through the central communication control section 101. All the terminal communication units 120a-120f then start the automatic control process in accordance with an operating method set for themselves (S304).

If all the control bands calculated by the communication control setup computation section 103 do not satisfy the required performance of the control band set for itself (if S303 is "NO"), the central communication unit 100 presents an improvement method of the control band through the display and input unit 160 (S305).

In the process of S305, the communication control setup computation section 103 of the central communication unit 100 presents, as an improvement method of the control band, a communication path addition scheme for reducing terminal communication units 120 in a communication channel between a set of the terminal communication units 120 exhibiting the maximum delay time of a communication group 600 that does not satisfy the required performance, and also presents a change scheme for the layout of the terminal communication units 120 in the network 150.

Next, a user of the distributed control system 10 adds a communication path for the network 150, changes the layout of the terminal communication units 120, or resets the required performance of the control band (S306) based on the method of improving the control band for the automatic control process, which is presented by the display and input unit 160. Then, the automatic setup is repeated for the automatic control process on each terminal communication unit 120 and the communication control (S302).

As described above, the distributed control system 10 performs setup for itself automatically and executes the automatic control process.

Figure 7:
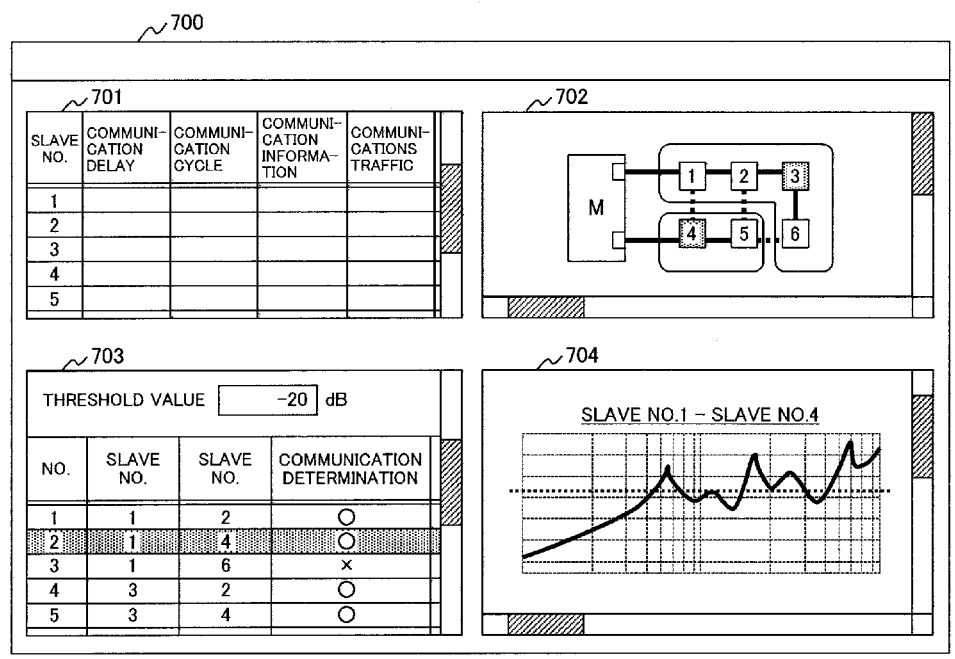
FIG. 7 shows a setup screen of a display and input unit according to the embodiment of the present invention.

FIG. 7 shows a setup screen 700 of the display and input unit 160 according to the present embodiment.

The setup screen 700 includes a communication performance setup/display section 701, a communication control setup/display section 702, a communication channel setup/display section 703, and a control performance display section 704.

The communication performance setup/display section 701 displays the communication performance of each terminal communication unit 120 based on an automatically set communication control scheme when the distributed control system 10 performs the automatic control process.

The communication control setup/display section 702 displays communication groups 600 set for individual terminal communication units 120, communication channels for the individual terminal communication units 120, and the terminal communication units 120 that perform the automatic control process when the distributed control system 10 performs the automatic control process.

The communication channel setup/display section 703 sets an amplitude threshold value of the transmission characteristics, which is required for setting a communication channel for each terminal communication unit 120, when the distributed control system 10 performs the automatic control process. Further, the communication channel setup/display section 703 displays the result of the automatic setup of the channel information about each terminal communication unit 120 based on the set threshold value. Here, it is assumed that a constant is used as the amplitude threshold value of the transmission characteristics, which is set by the communication channel setup/display section 703. However, the amplitude threshold value of the transmission characteristics is not limited to a constant value and, for example, may be a variable value depending on frequency.

The control performance display section 704 displays the transmission characteristics between the actuators 131 and sensors 130 connected to the distributed control system 10. At the same time, the control performance display section 704 shows magnitude relationship of the transmission characteristics compared to the amplitude threshold value of the transmission characteristics, which is set by the communication channel setup/display section 703.

In the present embodiment, even when the distributed control system. 10 is applied as a vibration damping instrument using many sensors 130 and many actuators 131, it is possible to perform automatic setup for an automatic control process and for a communication channel used during the execution of a control process of each terminal communication unit 120. Thus, adjustment and setup steps required for the distributed control system 10 can be reduced. Besides, it is easy to apply a vibration damping instrument later to the object 20 of which vibration is to be damped because the distributed control system 10 can be adjusted and set up to satisfy the required performance of the control.

Further, in the present embodiment, communication is not performed between a set of terminal communication units 120 which are determined that communication is unnecessary based on the transmission characteristics acquired by the terminal communication units 120. Therefore, communication paths of the network 150 through which communication is not performed can be reduced. Consequently, the distributed control system 10 according to the present embodiment can operate without sacrificing the functionality and performance even if such communication paths are reduced.

LIST OF REFERENCE CHARACTERS

10 . . . Distributed control system
20 . . . Object of which vibration is to be damped
100 . . . Central communication unit
101 . . . Central communication control section
102 . . . Transmission characteristics acquisition section
103 . . . Communication control setup computation section
110 . . . Communication signal control section
120, 120a-120f . . . Terminal communication unit
121 . . . Terminal communication control section
122 . . . Communication channel setup section
123 . . . Control information input/output setup section
124 . . . Control computation section
125 . . . Transmission characteristics computation section
126 . . . Device control section
130, 130a-130c . . . Sensor
131, 131a-130c . . . Actuator
140 . . . Communication port
150 . . . Network
160 . . . Display and input unit
600, 600a, 600b . . . Communication group
601, 601a, 601b . . . Communication
700 . . . Setup screen
701 . . . Communication performance setup/display section
702 . . . Communication control setup/display section
703 . . . Communication channel setup/display section
704 . . . Control performance display section

What is claimed is:

1. A distributed control system comprising:
   a central communication unit;
   a plurality of terminal communication units, each of which is connected to at least one sensor, at least one actuator, or both of at least one sensor and at least one actuator;
   a display and input unit connected to the central communication unit and configured to set and display control information; and
   a network which connects the central communication unit and the terminal communication units with communication paths and has a plurality of communication channels between the central communication unit and the terminal communication units;
   wherein the central communication unit includes a communication signal control section, a plurality of sets of communication ports, a central communication control section, and a communication control setup computation section;
   wherein each of the terminal communication units includes a communication signal control section, a plurality of sets of communication ports, a terminal communication control section, a communication channel setup section, a control information input/output setup section, a control computation section, and a device control section;
   wherein the network includes a transmission path between at least one communication port of the terminal communication units and at least one communication port of the central communication unit or at least one communication port of another terminal communication unit;

wherein the central communication unit sets up communication control for the terminal communication units based on transmission characteristic which is increase/decrease characteristic of a physical quantity, the physical quantity is a quantity of a time when a physical quantity generated by driving the actuator connected to a terminal communication unit propagates to at least one sensor connected to one or more terminal communication units;

wherein an automatic control process is performed in which a signal from at least one sensor connected to one or more terminal communication units is used as an input and driving of at least one actuator connected to one or more terminal communication units is used as an output;

wherein, if another terminal communication unit intervenes between an input and output of the automatic control process, the automatic control process is performed by using a communication of the network;

wherein the central communication unit compares an amount of communication data required for the automatic control process of a terminal communication unit, a communication delay time calculated from the communication channels, and an acceptable delay time that is a maximum delay time acceptable for control input/output which is calculated from required performance of the automatic control process, wherein the central communication unit selects a terminal communication unit to perform the automatic control process, sets a method of the automatic control process for the selected terminal communication unit through the network, and sets a communication channel and communication cycle in execution of the automatic control process for each of the terminal communication units connected to the actuator and the sensor related to the automatic control process, so that the value of the communication delay time does not exceed the acceptable delay time;

wherein a terminal communication unit for which the method of the automatic control process is set by the central communication unit performs the automatic control process in accordance with a setting of the automatic control process for the terminal communication unit; and wherein a terminal communication unit for which the communication channel and the communication cycle are set by the central communication unit performs communication control in accordance with the communication channel and the communication cycle that are set for the terminal communication unit.

2. The distributed control system according to claim 1,
wherein the central communication unit further includes a transmission characteristic acquisition section;
wherein each of the terminal communication units further includes a transmission characteristic computation section;
wherein each of the terminal communication units computes a transmission characteristic from a set of the actuator and the sensor with the transmission characteristic computation section and transfers the computed transmission characteristic to the central communication unit; and
wherein the central communication unit stores the transmission characteristic transferred from the terminal communication units in the transmission characteristic acquisition section.

3. The distributed control system according to claim 2,
wherein one of the terminal communication units connected to the actuator drives the actuator;
wherein the terminal communication unit driving the actuator transfers periodically a output value to the actuator through the network to all the terminal communication units connected to the sensor; and
wherein all the terminal communication units connected to the sensor compute the transmission characteristic simultaneously with driving of the actuator by using a physical quantity input from the sensor and the output value to the actuator, which is transferred through the network.

4. The distributed control system according to claim 1,
wherein, when an amplitude of the transmission characteristic is not greater than a threshold value set for the central communication unit, the central communication unit prevents a set of the terminal communication units connected to the actuator and the sensor related to the transmission characteristic from communicating during the automatic control process by setting a communication control method for each of the terminal communication units through the network; and
wherein the terminal communication units communicate during the automatic control process in accordance with the communication control method set for the central communication unit.

5. The distributed control system according to claim 1,
wherein the central communication unit selects a terminal communication unit to perform the automatic control process so as to minimize an amount of communication data required for the automatic control process of the terminal communication unit, and sets a method of the automatic control process for the selected terminal communication unit through the network; and
wherein the terminal communication unit performs the automatic control process in accordance with the method of the automatic control process set by the central communication unit.

6. The distributed control system according to claim 1,
wherein the display and input unit has an input function to input setup information for the central communication unit, and transfer the setup information to the central communication unit;
wherein the display and input unit has an output function to acquire the setup information for the central communication unit, the transmission characteristic to be stored in the central communication unit, and the setup information for the terminal communication units from the central communication unit, and output the information acquired from the central communication unit; and
wherein the display and input unit displays and sets up the control information by software through the input function and the output function.

7. The distributed control system according to claim 1,
wherein the distributed control system is applied as a control apparatus for an active vibration damping instrument; and
wherein a plurality of actuators and sensors which are connected to the terminal communication units are disposed at a plurality of locations of an object of which vibration is to be damped.

* * * * *